US009107057B2

(12) United States Patent
Gilbert et al.

(10) Patent No.: US 9,107,057 B2
(45) Date of Patent: Aug. 11, 2015

(54) METHODS, APPARATUSES, SYSTEMS AND COMPUTER READABLE MEDIUMS FOR DETERMINING LOCATION OF ASSETS

(71) Applicants: Harold C. Gilbert, Long Beach, CA (US); Michael W. Cox, Corona, CA (US); Ronald A. Borrell, Corona, CA (US)

(72) Inventors: Harold C. Gilbert, Long Beach, CA (US); Michael W. Cox, Corona, CA (US); Ronald A. Borrell, Corona, CA (US)

(73) Assignee: CORNERTURN LLC, Corona, CA (US)

( * ) Notice: Subject to any disclaimer, the term of this patent is extended or adjusted under 35 U.S.C. 154(b) by 321 days.

(21) Appl. No.: 13/839,620

(22) Filed: Mar. 15, 2013

(65) Prior Publication Data

US 2014/0273918 A1    Sep. 18, 2014

(51) Int. Cl.
*H04W 24/00*   (2009.01)
*H04W 4/22*    (2009.01)
*G01S 5/00*    (2006.01)

(52) U.S. Cl.
CPC .............. *H04W 4/22* (2013.01); *G01S 5/0018* (2013.01)

(58) Field of Classification Search
CPC .... H04W 24/00; H04W 64/00; H04W 64/003
USPC ............................................. 455/456.1–457
See application file for complete search history.

(56) References Cited

U.S. PATENT DOCUMENTS

| | | |
|---|---|---|
| 4,710,708 A | 12/1987 | Rorden et al. |
| 5,731,996 A | 3/1998 | Gilbert |
| 5,831,873 A | 11/1998 | Kohnen et al. |
| 6,269,324 B1 | 7/2001 | Rakijas et al. |
| 6,292,758 B1 | 9/2001 | Gilbert et al. |
| 7,307,595 B2 | 12/2007 | Schantz et al. |
| 2008/0204322 A1* | 8/2008 | Oswald et al. ............. 342/465 |
| 2009/0280742 A1 | 11/2009 | Schantz et al. |
| 2011/0316529 A1 | 12/2011 | Stancil et al. |

OTHER PUBLICATIONS

Arumugam, D.D. et al. (2011). "Experimental demonstration of complex image theory and application to position measurement" *IEEE Antennas and Wireless Propagation Letters*, 10, p. 282-285.
Nessler, N.H. (2000). "Electromagnetic location system for trapped miners." *Subsurface Sensing Technologies and Applications*, 1(2), p. 229-246.
Kononov, V.A. (1998). "Develop a trapped miner location system and an adequate rescue strategy and associated technologies" *CSIR Division of Mining Technology* GEN 502.
Wait, J.R. (1974). "Analytical investigations of electromagnetic location schemes relevant to mine rescue" *Bureau of Mines Pittsburgh Mining & Safety Research Center* Summary Report Contract H0122061.

* cited by examiner

*Primary Examiner* — Marisol Figueroa
(74) *Attorney, Agent, or Firm* — Harness, Dickey & Pierce, P.L.C.

(57) ABSTRACT

In locating a transmitter, a central processor calculates a matched filter detector output for each of one or more candidate transmitter locations by applying a linear filter to low frequency magnetic field measurements obtained at a plurality of receiver locations. The central processor then determines the location of the transmitter based on the one or more calculated matched filter detector outputs. The linear filter is derived for the one or more candidate transmitter locations.

44 Claims, 7 Drawing Sheets

007# METHODS, APPARATUSES, SYSTEMS AND COMPUTER READABLE MEDIUMS FOR DETERMINING LOCATION OF ASSETS

BACKGROUND

In situations immediately following a catastrophic event, first responders often must enter a hazardous environment, such as a burning, flooded, or collapsed structure, a cave-in, landslide, or avalanche. While it may not be possible for these persons to be visually observed, it is necessary for safety and efficacy to follow both progress and location of this type of personnel. This is especially true of larger scale operations involving special equipment and more than a few personnel.

If the degree of obstruction is relatively small, then conventional communications devices such as WiFi and cell phones may at least provide a link, if not a location or status. Often, mobile emergency equipment becomes available to provide improved communication capability or even an emergency command center. However, most wireless communication systems used in emergencies operate at higher frequencies and are severely attenuated by obstructions composed of ordinary materials like steel, concrete, rock, soil and water. For example, existing tracking systems based on global positioning satellites (GPS) or ultra-wideband and VHF/UHF time difference of arrival (TDOA) technology are severely attenuated by these types of obstructions, and have therefore proven unsuitable for this purpose.

SUMMARY

At least one example embodiment provides a method for locating a transmitter. According to at least this example embodiment, the method includes: calculating a matched filter detector output for each of one or more candidate transmitter locations by applying a linear filter to low frequency magnetic field measurements obtained at a plurality of receiver locations, the linear filter being derived for the one or more candidate transmitter locations; and determining the location of the transmitter based on the one or more calculated matched filter detector outputs.

At least one other example embodiment provides a method for locating a transmitter. According to at least this example embodiment, the method includes: maximizing a localization statistic by applying a linear filter to low frequency magnetic field measurements obtained at a plurality of receiver locations, the linear filter being determined based on a propagation model associated with one or more candidate transmitter locations; and locating the transmitter based on the maximized localization statistic.

At least one other example embodiment provides a computer readable storage medium storing instructions that, when executed, cause a processor to perform a method for locating a transmitter. According to at least this example embodiment, the method includes: calculating a matched filter detector output for each of one or more candidate transmitter locations by applying a linear filter to low frequency magnetic field measurements obtained at a plurality of receiver locations, the linear filter being derived for the one or more candidate transmitter locations; and determining the location of the transmitter based on the one or more calculated matched filter detector outputs.

At least one other example embodiment provides a computer readable storage medium storing instructions that, when executed, cause a processor to perform a method for locating a transmitter. According to at least this example embodiment, the method includes: maximizing a localization statistic by applying a linear filter to low frequency magnetic field measurements obtained at a plurality of receiver locations, the linear filter being determined based on a propagation model associated with one or more candidate transmitter locations; and locating the transmitter based on the maximized localization statistic.

According to at least some example embodiments, the method may further include hypothesizing a search domain including the one or more candidate transmitter locations.

The determining the location of the transmitter may include: identifying the location of the transmitter as the candidate location associated with a maximum matched filter detector output among the one or more calculated matched filter detector outputs.

According to at least some example embodiments, the determining the location of the transmitter may further include: comparing the one or more calculated matched filter detector outputs to determine the maximum matched filter detector output among the one or more calculated matched filter detector outputs.

The matched filter detector output may be a polynomial function representing the one or more candidate locations, and the method may further include: generating a plurality of contour values associated with the one or more candidate locations, wherein the location of the transmitter may be determined based on the contour values for the one or more candidate locations. The plurality of contour values may form a localization contour associated with the one or more candidate transmitter locations, and wherein the location of the transmitter may be determined based on the localization contour. The transmitter may be determined to be located at the candidate location having a maximum contour value among the plurality of contour values.

According to at least some example embodiments, the matched filter detector output may be a polynomial function representing a plurality of candidate locations for the transmitter, and wherein the determining the location of the transmitter may include: evaluating the polynomial function for each of the plurality of candidate locations to generate a plurality of contour values, each of the plurality of contour values being associated with a candidate location among the plurality of candidate locations, and identifying the location of the transmitter based on the plurality of contour values. The location of the transmitter may be identified as the candidate location among the plurality of candidate locations having a maximum contour value among the plurality of contour values.

According to at least some example embodiments, the method may further include: at least one of displaying and storing the location of the transmitter.

According to at least some example embodiments, the localization statistic may be a polynomial function representing the one or more candidate locations, and the method may further include: generating a plurality of contour values associated with the one or more candidate locations, wherein the transmitter may be determined to be located based on the contour values for the one or more candidate locations.

The plurality of contour values may form a localization contour associated with the one or more candidate transmitter locations, and wherein the location of the transmitter may be determined based on the localization contour. The transmitter may be determined to be located at the candidate location having a maximum contour value among the plurality of contour values.

According to at least some example embodiments, the low frequency magnetic field measurements may be generated based on magnetic field signals having frequencies between about 30 kHz and about 130 kHz.

According to at least some example embodiments, the linear filter may be determined based on a propagation model associated with the one or more candidate transmitter locations, and the propagation model may not include a complex image component.

According to at least some example embodiments, the linear filter may be determined based on a propagation model associated with the one or more candidate transmitter locations, and the propagation model may not account for effects defined by complex image theory.

At least one other example embodiment provides an apparatus for locating a transmitter. According to at least this example embodiment, the apparatus includes: a central processor configured to calculate a matched filter detector output for each of one or more candidate transmitter locations by applying a linear filter to low frequency magnetic field measurements obtained at a plurality of receiver locations, the linear filter being derived for the one or more candidate transmitter locations, the central processor being further configured to determine the location of the transmitter based on the one or more calculated matched filter detector outputs.

At least one other example embodiment provides an apparatus for locating a transmitter. According to at least this example embodiment, the apparatus includes: a central processor configured to maximize a localization statistic by applying a linear filter to low frequency magnetic field measurements obtained at a plurality of receiver locations, the linear filter being determined based on a propagation model associated with one or more candidate transmitter locations, the central processor being further configured to locate the transmitter based on the maximized localization statistic.

According to at least some example embodiments, the central processor may be further configured to hypothesize a search domain including the one or more candidate transmitter locations.

The central processor may be configured to identify the location of the transmitter as the candidate location associated with a maximum matched filter detector output among the one or more calculated matched filter detector outputs.

The central processor may be configured to compare the one or more calculated matched filter detector outputs to determine the maximum matched filter detector output among the one or more calculated matched filter detector outputs.

According to at least some example embodiments, the matched filter detector output may be a polynomial function representing the one or more candidate locations, and the central processor may be configured to: generate a plurality of contour values associated with the one or more candidate locations; and determine the location of the transmitter based on the contour values for the one or more candidate locations. The plurality of contour values form a localization contour associated with the one or more candidate transmitter locations, and wherein the central processor may be configured to determine the location of the transmitter based on the localization contour.

According to at least some example embodiments, the matched filter detector output may be a polynomial function representing a plurality of candidate locations for the transmitter, and wherein the central processor may be configured to: evaluate the polynomial function for each of the plurality of candidate locations to generate a plurality of contour values, each of the plurality of contour values being associated with a candidate location among the plurality of candidate locations; and identify the location of the transmitter based on the plurality of contour values.

The apparatus may further include: a display configured to display the location of the transmitter and/or a data storage configured to store the location of the transmitter.

According to at least some example embodiments, the localization statistic may be a polynomial function representing the one or more candidate locations, and the central processor may be further configured to: generate a plurality of contour values associated with the one or more candidate locations; and determine the location of the transmitter based on the contour values for the one or more candidate locations. The plurality of contour values may form a localization contour associated with the one or more candidate transmitter locations, and wherein the central processor may be configured to determine the location of the transmitter based on the localization contour.

According to at least some example embodiments, the low frequency magnetic field measurements may be generated based on magnetic field signals having frequencies between about 30 kHz and about 130 kHz.

According to at least some example embodiments, the linear filter may be determined based on a propagation model associated with the one or more candidate transmitter locations, and the propagation model may not include a complex image component.

According to at least some example embodiments, the linear filter may be determined based on a propagation model associated with the one or more candidate transmitter locations, and the propagation model may not account for effects defined by complex image theory.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected example embodiments and not all possible implementations, and are not intended to limit the scope of the present disclosure.

Corresponding reference numerals indicate corresponding parts throughout the several views of the drawings.

DETAILED DESCRIPTION

Figure 1:
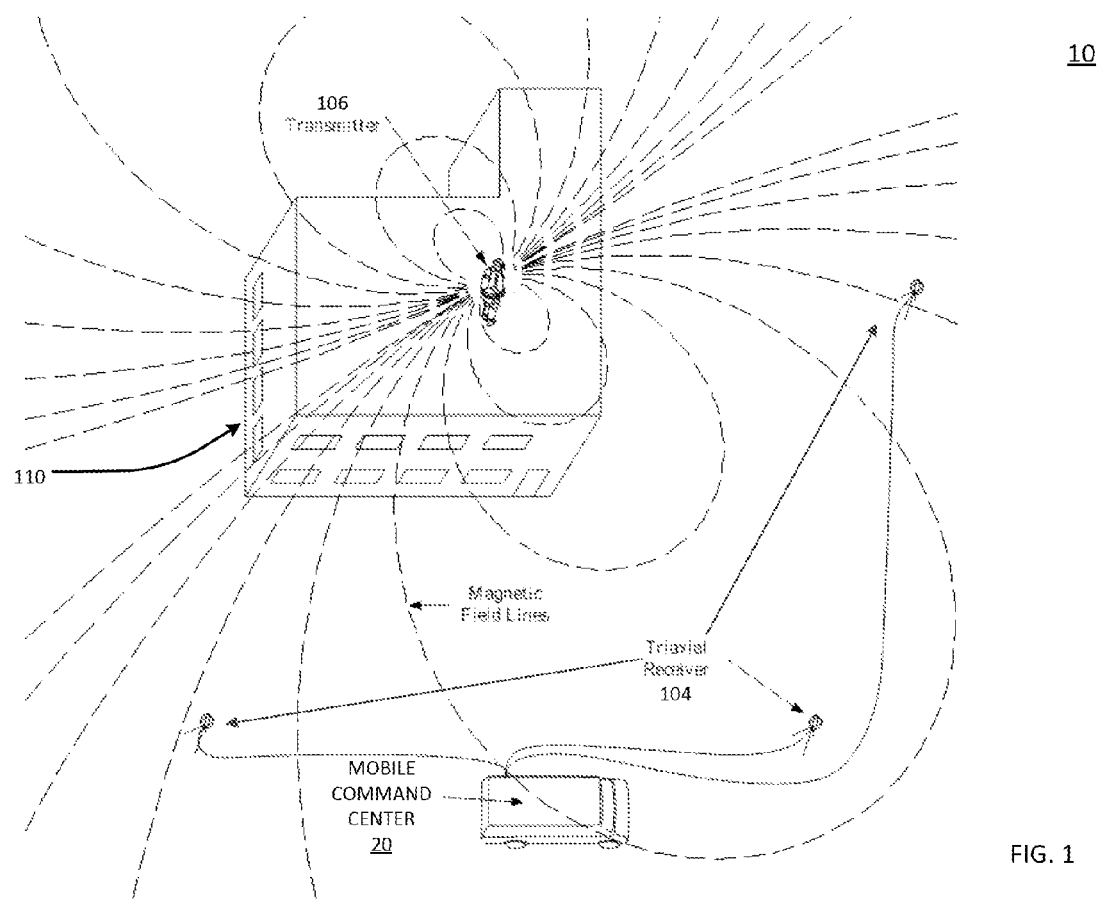
FIG. 1 illustrates a tracking system according to an example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents.

Example embodiments provide systems, methods, equipment, algorithms, computer readable storage mediums, and/or software for locating and tracking objects (e.g., persons and/or assets) using low frequency magnetic field transmitters and receivers. One or more example embodiments support the management of search and rescue operations by continuously monitoring the location of, for example, emergency personnel and vital equipment in a hazardous and/or chaotic environment. Example embodiments utilize low frequency magnetic fields able to propagate through a substantial mass of common structural and biological material with relatively little attenuation or distortion. Thus, example embodiments provide location information that is otherwise unavailable conventionally.

Example embodiments utilize a signal processing approach to the electromagnetic field inversion problem, which reduces computation load while using additional available information for greater accuracy. Example embodiments utilize magnetic sensors to localize a target by operating at frequencies uniquely suited for penetrating man-made obstructions like buildings and by utilizing only those components of a magnetic propagation model to achieve reasonable and/or sufficient localization accuracy for the selected operating frequencies.

As mentioned above, most conventional wireless communication systems used in emergencies operate at higher frequencies and are severely attenuated by obstructions composed of ordinary materials like steel, concrete, rock, soil, water, etc. On the other hand, a low frequency (LF) electromagnetic field (e.g., between about 30 kHz and 150 kHz, inclusive) is able to propagate through a significant amount of such material with relatively little loss and/or distortion. In fact, very low frequency (VLF) electromagnetic fields (e.g., between about 3 kHz and about 30 kHz) are able to penetrate a few kilometers into the ground. Systems using these electromagnetic fields have been developed for use in mine emergencies. Use of higher frequencies (e.g., between about 150 kHz and about 600 kHz, inclusive) have been recommended for magnetic systems attempting to localize and track an electromagnetic source in relatively open areas. However, these systems must more accurately account for propagation effects that become significant at these frequencies to maintain reasonable localization accuracy.

Example embodiments may be useful when penetration of man-made structures, which may also extend a relatively short distance underground (e.g., into a basement), is necessary to track sources (e.g., objects, persons, assets, etc.) inside the structure from devices located outside a structure, and without a line-of-sight to the source. At frequencies between about 30 kHz and about 130 kHz, inclusive, the signals are essentially or substantially unaffected by the intervening structures. Consequently, the processing used to estimate propagation effects may be simplified without sacrificing overall localization accuracy. At least some example embodiments provide for the frequent intermittent transmission from a low-frequency transmitter (emitter) borne by the emergency worker located inside the man-made structure, and received at several sensors strategically placed outside the structure for the purpose of identifying the worker's location. Any number of persons may be tracked simultaneously by setting up each transmitter (emitter) to transmit at a unique frequency. Vital assets other than personnel may also be tracked.

Figure 2:
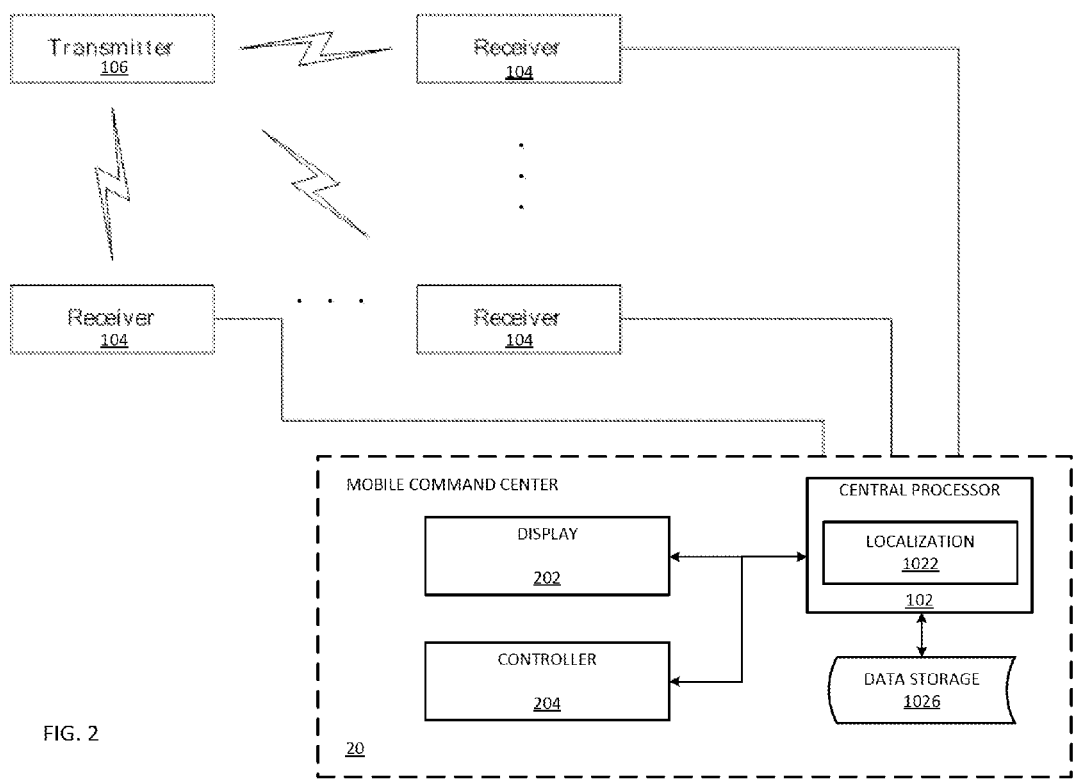
FIG. 2 is a block diagram illustrating the system shown in FIG. 1.

FIG. 1 illustrates an example embodiment of a tracking system 10. FIG. 2 is a block diagram of the tracking system 10 shown in FIG. 1. Example embodiments will be discussed with regard to localizing and/or locating a transmitter (or emitter) within a building. However, it should be understood that a transmitter may be localized in other situations using example embodiments. Thus, example embodiments should not be limited to only the situation described herein.

Referring to FIGS. 1 and 2, a transmitter (also referred to herein as an emitter) 106 with a magnetic induction coil is located within a building 110. In one example, the transmitter 106 may be a battery powered transmitter module embedded on a person or equipment (e.g., in the back of a rescue worker's jacket). Because transmitters including magnetic induction coils are generally well-known, only a brief discussion will be provided herein.

Figure 3:
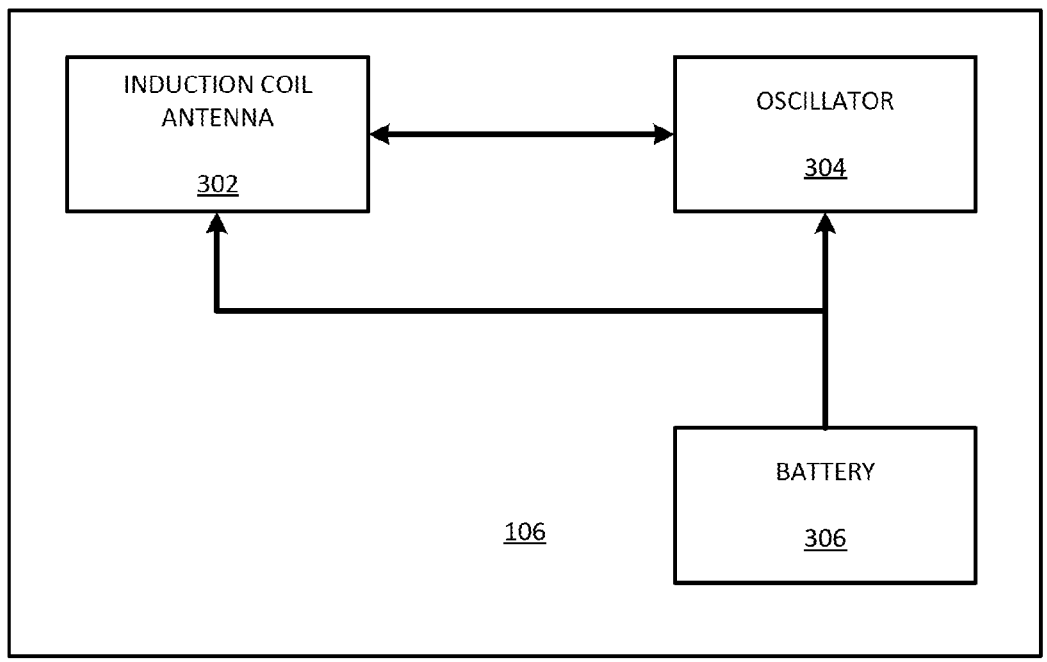
FIG. 3 is a block diagram illustrating an example embodiment of the transmitter 106.

FIG. 3 is a block diagram illustrating an example embodiment of the transmitter 106.

In the example embodiment shown in FIG. 3, the transmitter 106 is based on a relatively simple low frequency oscillator 304 driving an induction coil antenna 302 at the resonant frequency of the induction coil antenna 302. The induction coil antenna 302 may be of any conventional design, or may be physically flexible so as to be integrated into, for example, clothing.

In at least one example embodiment, to operate in the low frequency band, the antenna loop of the induction coil antenna 302 may have a diameter between about 20 and about 40 centimeters, inclusive. However, larger coils and power packs capable of operating at lower frequencies for better penetration may also be used.

Still referring to FIG. 3, the transmitter 106 further includes a battery 306 to power the induction coil antenna 302 and the oscillator 304.

Although FIG. 3 illustrates the induction coil antenna 302 and oscillator 304 as powered by a common battery source 306, these elements may be powered by separate, dedicated sources (e.g., batteries).

To reduce power consumption, the transmitter 106 may be configured to transmit relatively brief signal bursts at regular intervals (e.g., of about 1, 2, 3, etc. seconds). A duty cycle of between about 5 and about 10 percent, inclusive, may be implemented with capacitive charging to improve battery efficiency.

The transmitter 106 shown in FIGS. 1-3 is configured to emit a magnetic field signal (sometimes referred to herein as a magnetic field or magnetic field vector signal) in the low frequency band such that the emitted magnetic field signal penetrates through obstructions (e.g., walls of the building 110) with reduced (e.g., little and/or negligible) distortion of the signal. The operating frequency of the transmitter 106 may be chosen during setup by an operator to improve and/or optimize performance by manually adjusting the transmitter and receiver circuits. Multiple frequencies in a narrow band may be used to independently track multiple sources. In one example, each of a plurality of transmitters may emit a signal at a different frequency such that multiple transmitters may be localized and/or tracked simultaneously and/or concurrently.

In example operation, the transmitter 106 generates the magnetic field signal in accordance with the physical laws of Maxwell's equations, which define both the electric and magnetic field components. The complete expression for the emitted magnetic field signal is commonly formulated as an infinite series in increasing powers of 1/r. The first three terms of this series are generally referred to as the near field, intermediate field and far field components. In free space, at distances greater than the diameter of the induction coil antenna 302 of the transmitter 106, but less than about ⅓ of wavelength (e.g., between about 650 and about 2000 meters, inclusive, for selected frequencies of interest), the magnetic field component of the magnetic field signal may be accurately approximated by only the near field component. The near field component is generally identified by the dipole equation given below in Equation (1).

$$\vec{H}(\vec{r}, t) = \frac{m}{4\pi r^3}(3\hat{r}(\hat{r}\cdot\hat{m}) - \hat{m})e^{jkr-j\omega t}, \quad (1)$$

$$\begin{cases} \vec{r} = r\hat{r} \\ \vec{m} = m\hat{m} \end{cases}$$

In Equation (1), $\vec{H}$ is the magnetic field vector, and $\vec{r} = \vec{r}_i - \vec{r}_o$ is a vector from the dipole source position $\vec{r}_o$ (e.g., location of the transmitter 106 in FIGS. 1 and 2) to any point $\vec{r}_i$ (i=1, 2, 3, ..., N) where the vector $\vec{r}$ has magnitude r along the direction of the unit vector $\hat{r}$. Also in Equation (1), $\vec{m}$ is the magnetic dipole moment vector having magnitude m along the direction of the unit vector $\hat{m}$, t represents time, $\omega$ represents the oscillation frequency of the signal (in radians per second), k represents the wave number of the signal (in radians per meter), and j is the square root of −1. In the context of FIGS. 1 and 2, the location $r_i$ refers to the locations of the receivers 104.

Returning to FIGS. 1 and 2, the tracking system 10 further includes a plurality of receivers 104 arranged at arbitrary positions around the outside of the building 110. In one example, receivers 104 may be triaxial receivers mounted on portable tripod stands. The receivers 104 may be lightweight, portable receiver stations capable of being rapidly deployed around the work site in out-of-the-way locations.

According to at least some example embodiments, the total number of receiver channels matches or exceeds the number of unknown parameters to be determined. The number of receiver channels is the sum of independent sensor axis measurements. In one example, the unknown parameters include three components of source (transmitter 106) location, three components of the source (transmitter 106) dipole moment vector, and a time reference for each receiver 104. In this example, the source location refers to the location $\vec{r}_o$ of the transmitter 106, and the source dipole moment vector refers to the dipole moment vector $\vec{m}$ of the magnetic field signal from the transmitter 106.

According to at least some example embodiments, local conditions of the transmitter 106 and the receivers 104 may allow the number of unknown parameters to be reduced. For example, if all elements (e.g., transmitter, receiver, etc.) of the physical arrangement of the tracking system lie in a level plane, then the vertical component of the transmitter location and the vertical component of the source dipole moment vector may be ignored. In another example, if the receiver channels are synchronized using a common phase reference such as that available via a global positioning system (GPS), then the station time reference is not an unknown parameter and may be ignored.

Each of the receivers 104 may measure one or more (e.g., one, two, or three) independent orthogonal components of the magnetic field signal from the transmitter 106.

Figure 4:
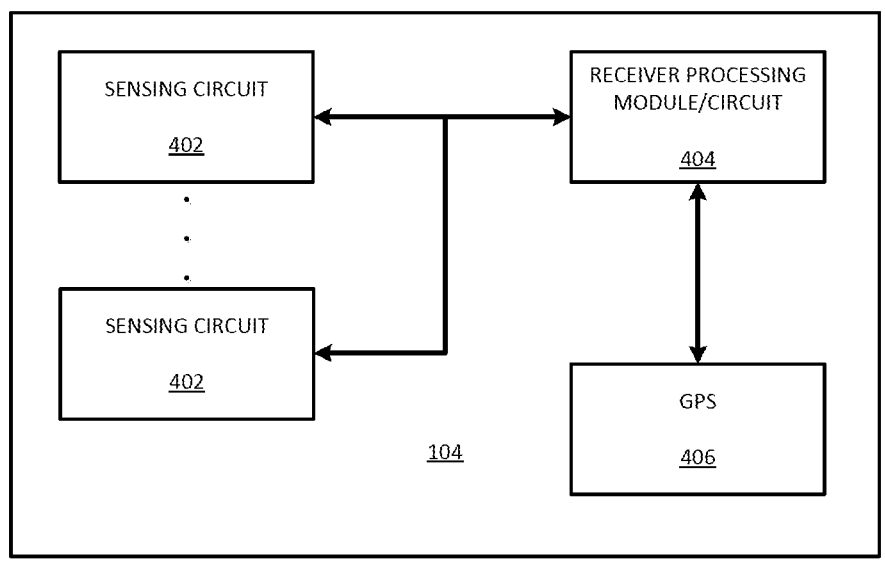
FIG. 4 is a block diagram illustrating an example embodiment of a receiver 104 in more detail.

FIG. 4 is a block diagram illustrating an example embodiment of the receiver 104 in more detail.

Referring to FIG. 4, the receiver 104 includes one or more sensing elements or circuits (e.g., induction coil antennas) 402 and a receiver processing module/circuit (hereinafter referred to as the receiver processing module) 404.

Each sensing circuit 402 is sensitive to the component of the dipole moment vector of the magnetic field signal that is perpendicular to the plane of the coil. In one example, each receiver 104 includes multiple concentric orthogonal coils to measure a plurality of dipole moment vector components of the magnetic field signal simultaneously and/or concurrently. The sensing circuit 402 may be tuned to the frequency of the transmitter 106 to improve signal power and/or reduce extraneous noise power. The receiver 104 may also include well-known additional circuitry to filter, amplify and digitize the received signal. Because such circuitry is well-known, the circuitry is not shown and will not be discussed in detail.

Still referring to FIG. 4, the receiver processing module 404 may be a processor configured to generate magnetic field measurements based on the magnetic field signal received at the sensing circuit 402, and transmit the magnetic field measurements to a central processor 102 over the communication network.

In one example, the receiver processing module 404 extracts and evaluates the magnetic field signal received at the sensing circuit 402 to generate the magnetic field measurements.

The receiver processing module 404 may also be configured to quantify multiple magnetic field signals at different frequencies (e.g., to enable tracking of multiple transmitters concurrently and/or simultaneously), manage a network interface, and provide operational control and status functionality. The operational control and status functionality may include the ability to support rapid deployment and automated initialization of the tracking system in the field. In this regard, the receiver 104 further includes a global positioning system (GPS) interface 406 to obtain location information from GPS satellites, establish its own location and altitude, and to synchronize received magnetic field measurements.

The receiver processing module 404 may be realized in hardware, software or a combination of hardware and software. In one example, the receiver processing module 404 may include one or more central processing units (CPUs), digital signal processors (DSPs), application-specific-integrated-circuits (ASICs), field programmable gate arrays (FPGAs) computers or the like.

Each receiver 104 may be powered internally by a self-contained battery pack, or by an externally connected power source.

Example operation of the receivers 104 will be discussed in more detail below with regard to FIG. 5.

Figure 5:
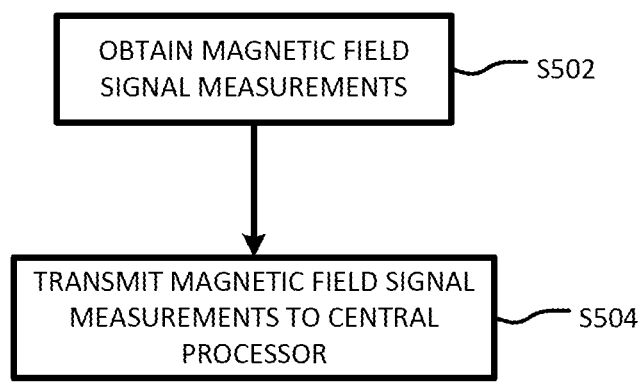
FIG. 5 is a flow chart illustrating example operation of the receiver 104 shown in FIG. 4.

FIG. 5 is a flow chart illustrating example operation of the receiver 104 shown in FIG. 4. Although only a single receiver 104 will be discussed with regard to FIG. 5 it should be understood that each of the N receivers 104 in FIGS. 1 and 2 may operate in the same or substantially the same manner.

Referring to FIG. 5, at S502 the i-th receiver 104 measures the incident magnetic field (signal) from the transmitter 106 at S502 to generate a set of magnetic field measurements (e.g., referred to as $\vec{H}(\vec{r}_i)$ below, where i is an index for the i-th receiver 104 among the N receivers in the tracking system 10).

At S504, the receiver 104 reports the set of magnetic field measurements $\vec{H}(\vec{r}_i)$ to the central processor 102 over the communication network.

At a low enough frequency (e.g., between about 30 kHz and about 130 kHz) that the position $\vec{r}_i$ of each receiver 104 is in the near field of the position $\vec{r}_o$ of the transmitter 106 and (for simplicity) if the measurements are taken synchronously at each of the receivers 104 (non-synchronous measurements may be accounted for in the calculations), each receiver 104 collects the set of magnetic field measurements $\vec{H}(\vec{r}_i)$ given by Equation (2) shown below. Equation (2) is a matrix equation representation for the dipole equation at the location $\vec{r}_i$ of the i-th receiver 104.

$$\vec{H}(\vec{r}_i) = F(\vec{r}_o, \vec{r}_i)\vec{m} + \vec{v} \quad (2)$$

For simplicity of this discussion, the notation for the magnetic field term measurement $\vec{H}$ in Equation (1) has been changed to be a function of location $\vec{r}_i$ of the i-th receiver 104 in Equation (2). The reference to time t has also been removed since Equation (2) represents synchronous measurements at the same or substantially the same instant in time. The vector $\vec{v}$ in Equation (2) is additive noise that represents, for example, measurement error, background noise, etc. The matrix F is a magnetic field function or propagation model that (depending on the complexity of the propagation effects included in matrix F) can be used to predict the expected magnitude and orientation of the magnetic field at the position $\vec{r}_i$ of the i-th receiver 104 given a magnetic dipole moment $\vec{m}$ at the location $\vec{r}_o$ of the transmitter 106. The magnetic field function (or propagation model) F will be discussed in more detail later.

Returning to FIGS. 1 and 2, the receivers 104 are communicatively coupled to the central processor 102 at the mobile command center 20. In this example embodiment, the central processor 102 is co-located with a display 202, a data storage 1026, and a controller 204 at the mobile command center 20. Although not shown, other emergency equipment may also be located at the mobile command center 20. The central processor 102 includes a localization module 1022.

The controller 204 provides a variety of functions. For example, the controller 204 monitors performance of the transmitters 106, receivers 104, communication system, and the central processor 102, and provides feedback to the operator in the form of status displays, alerts, warnings, etc.

The controller 204 also performs initialization functions automatically and/or under operator control. Example initialization functions may include: establishing or hypothesizing location and/or alignment of receivers/sensors 104; establishing/hypothesizing the search/tracking domain (discussed in more detail later); establishing propagating model parameters for a working environment; setting up transmitter and receiver operating and calibration factors; setting up communication protocols for the receiver network; executing periodic performance monitoring tests; and building and maintaining a runtime log of events.

The controller 204 also provides for changes in the system arrangement such as: adding and removing transmitters and receivers; adjusting the search/tracking domain; revising operating frequencies; etc. The controller 204 also enables selective playback of previously recorded information and detailed examination of specific transmitter, receiver, and network functions.

In one example, the receivers 104 and the central processor 102 may be connected via a communication network. The communication network may be hard wired, a radio communication network, or a combination thereof. According to at least some example embodiments, the communication network may be a low data rate communication network independently connecting the central processor 102 to each receiver 104. The communication network may be established using any combination of 1) a radio frequency (RF) link, 2) a dedicated cable temporarily deployed, or 3) an existing on-site cable network. The communication network may support the transfer of sensor measurements and control and status information.

The central processor 102 may be a stand-alone unit (e.g., desktop or workstation computer) or part of an integrated mobile command center 20 (e.g., a shared resource such as a mobile command center processing system). In example operation, the central processor 102 receives magnetic field measurement information (e.g., magnetic field vector component measurements taken at the receivers 104) from the receivers 104 and generates a continuous track of one or more transmitters 106. The central processor 102 may include one or more Central Processing Units (CPUs), digital signal processors (DSPs), application-specific-integrated-circuits, field programmable gate arrays (FPGAs) computers or the like. Example functionality of the central processor 102 will be discussed in more detail below with regard to FIG. 6.

The tracking system 10 shown in FIGS. 1 and 2 may be configured to self-initialize when powered up by using GPS (e.g., as shown in FIG. 5) or beacon signals to establish position and alignment of the receivers 104. Multiple transmitters may be monitored and tracked simultaneously by using signals having different frequencies.

Figure 6:
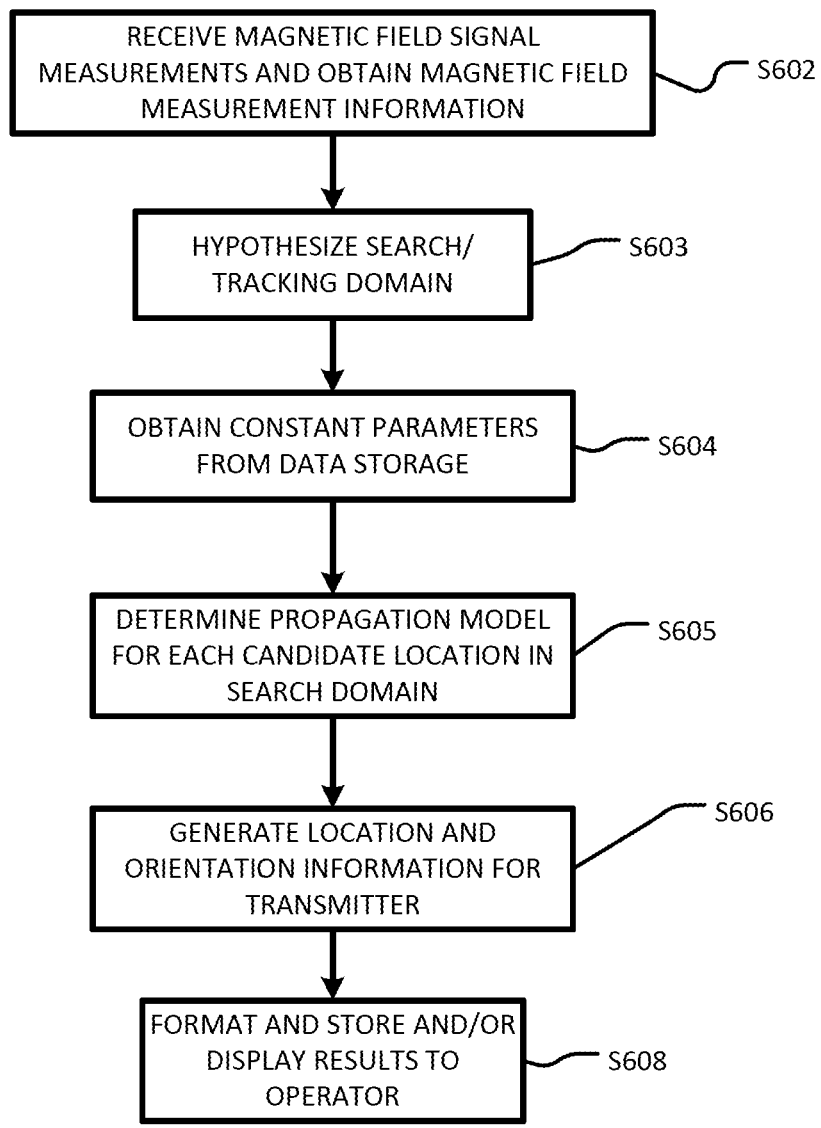
FIG. 6 is a flow chart illustrating a method for locating and/or localizing a transmitter according to an example embodiment.

FIG. 6 is a flow chart illustrating a method for localizing or locating a transmitter according to an example embodiment. For example purposes, the example embodiment shown in FIG. 6 will be discussed as being performed by the localization module 1022 of the central processor 102 at the mobile command center 20 shown in FIGS. 1 and 2. However, example embodiments should not be specifically limited to only this example.

Referring to FIG. 6, at S602 the central processor 102 receives a set of magnetic field measurements $\vec{H}(\vec{r}_i)$ from each of the N receivers 104. The central processor 102 stores the received sets of magnetic field measurements $\vec{H}(\vec{r}_i)$ in the data storage 1026. The data storage 1026 may be any suitable volatile or non-volatile memory. The central processor 102 may combine the sets of magnetic field measurements $\vec{H}(\vec{r}_i)$ from each of the N receivers into a matrix $$H = \begin{bmatrix} \vec{H}(\vec{r}_1) \\ \vec{H}(\vec{r}_2) \\ \vdots \\ \vec{H}(\vec{r}_N) \end{bmatrix}.$$

Also at S602, the central processor 102 may obtain magnetic field signal characteristics and/or magnetic field measurement information based on the magnetic field measurements $\vec{H}(\vec{r}_i)$ from each receiver 104 using, for example, a Fourier transform technique. In this regard, at least some example embodiments utilize processing based on well-known Fourier transform techniques to extract this information from the sets of magnetic field measurements $\vec{H}(\vec{r}_i)$ received from the receivers 104. Because these techniques are generally well known a further detailed discussion is omitted. The information may also be stored in the data storage 1026.

Estimated magnetic field signal characteristics and magnetic field measurement information may include, for example: signal frequency, complex signal amplitude, and signal amplitude error variance. The latter may be used to determine the signal-to-noise ratio (SNR) as the ratio of the signal power to its error variance. These error variances are combined with other associated error statistics in the noise covariance matrix R discussed in more detail later, for example, with regard to Equation (9). Using this example approach, noisy and more error prone measurements contribute less information to the estimates than quiet and less error prone measurements.

Returning to FIG. 6, at S603, the localization module 1022 hypothesizes a search/tracking domain of one or more candidate locations of the transmitter 106.

In one example, the search domain may be identified as a "search grid". In this example, one or more candidate locations for the transmitter 106 are laid out in an arbitrary three-dimensional pattern, the size and density of which may be set by the operator. This method may be performed by the localization module 1022 or controller 204 during initialization when a new asset/transmitter is deployed, and/or if an asset/transmitter is lost, to establish the location of the candidate transmitter within a broad area (e.g., an entire building). In this case, the candidate transmitter locations are laid out in a search domain encompassing the broad area.

In one example, the search grid may be laid out using an arbitrary initial location within a given area. In another example, the search grid may be laid out using an initial location in the neighborhood of a previous solution. For example, the search grid may be laid out by centering it on the previous estimated location of the transmitter, and the grid may encompass a smaller area (e.g., one or more floors of a building).

Returning to FIG. 6, at S604 the localization module obtains constant localization parameters from the data storage 1026. In one example, the constant localization parameters include: location and alignment of the receivers 104; propagation factors and phase delays for the environment in which the tracking system 10 is deployed; receiver calibration factors; expected source frequencies; etc.

The location and alignment of the receivers 104 may be determined based on, for example, location information obtained from global positioning system (GPS) satellites. Constant localization parameters such as propagation factors and phase delays for the environment in which the tracking system 10 is deployed, receiver calibration factors, and expected source frequencies may be determined by systems engineers based on empirical data and/or set by an operator of the tracking system 10 during and/or prior to deployment of the tracking system 10.

According to at least one example embodiment, the constant localization parameters may include the hypothesized search domain of one or more candidate locations. In this case, the search domain is obtained from the data storage 1026 along with other constant localization parameters, and S603 and S604 in FIG. 6 may be combined.

At S605, the localization module 1022 determines or generates a magnetic field function (propagation model) F for each of the one or more candidate locations within the hypothesized search domain based on the constant localization parameters obtained from the data storage 1026.

The magnetic field function F embodies a propagation model that relates the magnetic field at a point $\vec{r}_i$ (e.g., location of a receiver 104) to a given dipole moment source $\vec{m}$ located at another point $\vec{r}_o$ (e.g., candidate location in the search domain). The localization process according to one or more example embodiments may utilize any physical magnetic field model that can be suitably formulated. Numerous models of near-earth propagation have been developed and refined over the past century implementing Maxwell's equations subject to the natural boundaries of the biosphere. Examples of models that are widely used by the scientific community have been developed and enhanced by A. Sommerfeld, K. Norton, and P. Bannister. Since magnetic fields may be linearly superimposed, the contributions to a propagating field, and therefore to the magnetic field function F, may be simply summed as shown below in Equation (3).

$$F=F_0+F_1+F_2+F_3+F_4 \qquad (3)$$

The components of the magnetic field function F shown in Equation (3) are defined as follows. The direct blast $F_0$ is given by the free space wave of Equation (1) discussed above. The mirror image reflection $F_1$ assumes a perfectly conducting ground and appears to propagate from an image source below the earth surface. The complex image reflection $F_2$ models the phase distortion of an imperfectly conducting earth and appears to propagate from an imaginary source at a complex depth. The surface wave $F_3$ propagates a relatively short distance along the conductive earth surface as if it were a waveguide. The sky wave reflection $F_4$ bounces off one of the imperfectly conducting ionospheric layers.

The magnetic field function F used in the calculations set forth herein may include any or all of these elements as well as others that have not been identified here. A particular magnetic field function F may be selected based on the distance, elevation, operating frequency, environmental conditions, required accuracy, etc. of the situation. Under the conditions discussed in connection with one or more example embodiments, the magnetic field function F used in these example embodiments includes only $F_0$, $F_1$, and $F_3$; the complex image $F_2$ (which is derived from complex image theory) and the sky wave $F_4$ components are not required nor do they add significant value at the assumed operating frequencies and ranges of operation for this application. The complex image $F_2$ may also be referred to as the complex image component of the magnetic field function F. By omitting the complex image $F_2$, the propagation model does not account for effects defined by complex image theory.

Returning to FIG. 6, at S606 the localization module 1022 generates the location information for the transmitter 106 based on the magnetic field function F for the pairing of each receiver and each of the candidate locations in the search domain that is considered and/or evaluated (e.g., all candidate locations in the search domain). In one example, the location information may include the estimated 3-dimensional location of the transmitter 106, together with error statistics that may be presented to the operator as a general measure of the area of uncertainty in the localization estimate provided by the system.

In more detail, at S606 localization module 1022 calculates a matched filter detector output (also referred to herein as a location statistic) $\Lambda$ for each of one or more candidate transmitter locations in the hypothesized search domain by applying a linear filter h for each candidate location to the matrix H of low frequency magnetic field measurements $\vec{H}(\vec{r}_i)$ from the plurality of remote receiver locations as shown below in Equation (11).

$$\Lambda=h^*H \qquad (11)$$

The linear filter h in Equation (11) for each candidate location is given by, $$h=R^{-1}\tilde{H} \qquad (12),$$

and the estimated magnetic field (magnetic field signal) $\tilde{H}$ is given by, $$\tilde{H}=F\tilde{m}=F(F^*R^{-1}F)^{-1}F^*R^{-1}H \qquad (10).$$

The estimated magnetic field (signal) $\tilde{H}$ is the estimated magnetic field (magnetic field signal) $\tilde{H}$ produced by the estimated dipole moment vector $\tilde{m}$ at the position $r_i$ of the i-th receiver 104 for each candidate location in the search domain. R is the noise covariance matrix mentioned above, and discussed in more detail later.

As shown in Equations (10) and (12), which are discussed in more detail below, the linear filter h is determined for each candidate location in the search domain that is considered or evaluated. Moreover, the linear filter h is determined based on the magnetic field function F for the pairing of each receiver and each candidate location in the search domain that is considered or evaluated. The linear filter may h be determined using the magnetic field function (or propagation model) F that does not include the complex image component $F_2$ and/or does not account for effects defined by complex image theory.

Substituting $F(F^*R^{-1}F)^{-1}F^*R^{-1}H$ from Equation (10) for the estimated magnetic field signal $\tilde{H}$ in Equation (12) gives the matched filter detector shown below in Equation (13).

$$\Lambda(r_o)=H^*PH, \text{ where } P=R^{-1}F(F^*R^{-1}F)^{-1}F^*R^{-1} \qquad (13)$$

Thus, by applying the linear filter h, the localization module 1022 calculates a matched filter detector output Λ for each candidate location in the search domain using the matched filter detector given by Equation (13).

As shown in Equation (13), the actual calculation of the matched filter detector output Λ is based on the magnetic field measurements H, the magnetic field function F, and the noise covariance matrix R.

The matched filter detector in Equation (13) maximizes the matched filter detector output Λ when the hypothesized candidate location $\vec{r}_o$ used in the expression for the magnetic field function F is closest to the actual position of the transmitter 106. In other words, the localization module 1022 determines that the transmitter 106 is located at the candidate location associated with the maximum matched filter detector output Λ.

The localization module 1022 maximizes the matched filter detector output Λ for the candidate locations in the search domain to determine the best estimate for the actual location of the transmitter 106.

In Equation (13), P is a Hermetian positive-definite matrix, which is an orthogonal projection matrix that projects the $R^{3N}$ measurement vector H onto the three dimensional $R^3$ space of the dipole moment vector in a least squares sense.

In one example, the localization module 1022 may determine the maximum matched filter detector output Λ by comparing the calculated matched filter detector outputs Λ for each of the candidate locations in the search domain to determine the maximum matched filter detector output Λ. The candidate location associated with the maximum matched filter detector output Λ is identified as the location of the transmitter 106. In one example, the localization module 1022 may select the candidate location associated with the maximum matched filter detector output Λ as the location of the transmitter 106.

In another example method, the localization module 1022 may determine the maximum matched filter detector output Λ using "algorithmic optimization". In this method, the localization module 1022 utilizes an initial location (e.g., a recent previous location of the transmitter) in the near neighborhood of the final solution and proceeds by applying any one of a number of well-known functional optimization algorithms to identify a maximum value of a matched filter detector output Λ in three-dimensional space. A standard gradient search is one example of a technique that could be used to implement this method. However, example embodiments should not be limited to this example.

Algorithmic optimization may be more suitable for continuous tracking where the last known location may be used as the initial location to initialize the search for the maximum value. This method utilizes less time and computational effort than the search grid.

In yet another example method, the localization module 1022 may utilize a "Kalman filter" to determine the maximum value of a matched filter detector output Λ. In this example, the localization module 1022 employs a state variable to update the previous location of the transmitter in a single step using a new or updated set of magnetic field measurements from the receivers 104. In this example, the form of Equation (13) is modified and scattered over various parts of the Kalman equations to implement this method. This method may be more efficient for continuous tracking, but may also require more frequent measurement updates.

Each of the above-discussed example methods are based on optimizing the matched filter detector output Λ in Equation (13), wherein the unknown transmitter dipole moment is resolved internally by the maximum likelihood estimator in Equation (9), which is discussed in more detail later.

According to at least one example embodiment, the system may switch between the example optimization methods automatically as desired or as directed by an operator.

Returning to FIG. 6, once having determined location information for the transmitter 106, at S608 the localization module 1022 formats the determined location information and outputs the location information to display 202. The display 202 displays the location information to an operator. The display 202 may be any suitable display device (e.g., a computer monitor, etc.). In one example, the location information may be displayed to the operator on a map of the area in which the transmitter is located. Because methods for formatting and displaying location information are well known, further detailed discussion is omitted.

Also, or alternatively, at S608, the localization module 1022 may store the location information at the data storage 1026.

In parallel with the main process, the central processor 102 may also monitor and report the system health status and possible errors via the display 202. A system operator inside the mobile command center 20 may monitor the location and status of the transmitter 106 on the display 202.

An example derivation related to example embodiments will now be discussed in more detail for the sake of clarity. The discussion will be made with regard to the tracking system shown in FIGS. 1 and 2.

As mentioned above, the magnetic field component of the magnetic field signal generated by the transmitter 106 may be accurately approximated using only the near field component, generally identified by the dipole equation given by Equation (1).

$$\vec{H}(\vec{r}, t) = \frac{m}{4\pi r^3}(3\hat{r}(\hat{r}\cdot\hat{m}) - \hat{m})e^{jkr-j\omega t}, \quad (1)$$

$$\begin{cases} \vec{r} = r\hat{r} \\ \vec{m} = m\hat{m} \end{cases}$$

In Equation (1), $\vec{H}$ is the magnetic field vector, $\vec{r} = \vec{r}_i - \vec{r}_o$ is a vector from the position $\vec{r}_o$ of the transmitter 106 to any point $\vec{r}_i$ (i=1, 2, 3, ..., N) where the vector $\vec{r}$ has magnitude r along the direction of the unit vector $\hat{r}$. Also in Equation (1), $\vec{m}$ is the magnetic dipole moment vector having magnitude m along the direction of the unit vector $\hat{m}$, t represents time, ω represents the oscillation frequency of the signal (in radians per second), k represents the wave number of the signal (in radians per meter), and j is the square root of −1.

As also discussed above, Equation (2) is a matrix equation representation for the dipole equation at the i-th receiver location $\vec{r}_i$.

$$\vec{H}(\vec{r}_i) = F(\vec{r}_o, \vec{r}_i)\vec{m} + \vec{v} \quad (2)$$

Equation (2) may be used as the basis for representing the magnetic field vector at the locations $\vec{r}_i$ of N receivers 104 as a single matrix equation including 3N simultaneous linear equations as shown below in Equation (4).

$$\begin{bmatrix} \vec{H}(\vec{r}_1) \\ \vec{H}(\vec{r}_2) \\ \vdots \\ \vec{H}(\vec{r}_N) \end{bmatrix} = \begin{bmatrix} F(\vec{r}_0, \vec{r}_1) \\ F(\vec{r}_0, \vec{r}_2) \\ \vdots \\ F(\vec{r}_0, \vec{r}_N) \end{bmatrix} \vec{m} + \begin{bmatrix} \vec{v}_1 \\ \vec{v}_2 \\ \vdots \\ \vec{v}_N \end{bmatrix} \quad (4)$$

To simplify notation, Equation (4) can be re-written in a simpler form without the indices i as shown below in Equation (5).

$$H = F\vec{m} + v \quad (5)$$

Equation (5), and as discussed above, H is a matrix of measurements from the N receivers 104 given by, $$H = \begin{bmatrix} \vec{H}(\vec{r}_1) \\ \vec{H}(\vec{r}_2) \\ \vdots \\ \vec{H}(\vec{r}_N) \end{bmatrix}, \quad (6)$$

the magnetic field function (or propagation model) F is a matrix given by, $$F = \begin{bmatrix} F(\vec{r}_0, \vec{r}_1) \\ F(\vec{r}_0, \vec{r}_2) \\ \vdots \\ F(\vec{r}_0, \vec{r}_N) \end{bmatrix}, \quad (7)$$

and matrix v is given by, $$v = \begin{bmatrix} \vec{v}_1 \\ \vec{v}_2 \\ \vdots \\ \vec{v}_N \end{bmatrix}. \quad (8)$$

As mentioned above, the elements of the matrix H are the sets of measurements collected at various locations $\vec{r}_i$ of the receivers 104. The locations $\vec{r}_i$ are known at the localization module 1022. The elements of the magnetic field function (or matrix) F represent the propagation model from the location of the transmitter 106 to each of the locations of the receivers 104, and the elements of the matrix v represent unknown noise at each of the receiver locations.

Also in Equation (5), $\vec{m}$ is the magnetic dipole moment vector, which has magnitude m along the direction of the unit vector $\hat{m}$ term, and $\vec{r}_o$ is the dipole source position $\vec{r}_o$; that is, the location of the transmitter 106.

Equations (5)-(8) may be used to represent the magnetic dipole moment vector $\vec{m}$ of the magnetic field signal by inverting the field equation given by Equations (4) and (5) as shown below in Equation (9).

$$\tilde{m} = (F^* R^{-1} F)^{-1} F^* R^{-1} H \quad (9)$$

In Equation (9), $\tilde{m}$ is the estimated value of the magnetic dipole moment vector $\vec{m}$, $F^*$ represents the conjugate transpose of magnetic field function F, and R represents the noise covariance matrix given by $R = E\{\vec{v}\vec{v}^T\}$.

Statistical error in the estimate of the estimated magnetic dipole moment vector $\tilde{m}$ is reduced and/or minimized by weighting the measurements as shown using the inverse ($R^{-1}$) of the noise covariance matrix R.

By inserting the expression for the estimated magnetic dipole moment $\tilde{m}$ shown in Equation (9) into Equation (2) (i.e., $\vec{H}(\vec{r}_i) = F(\vec{r}_o, \vec{r}_i)\vec{m} + \vec{v}$), an expression to determine the estimated magnetic field (signal) $\tilde{H}$ produced by the estimated dipole moment vector $\tilde{m}$ at the position $r_i$ of the i-th receiver 104 for each candidate location in the search domain is given by, $$\tilde{H} = F\tilde{m} = F(F^* R^{-1} F)^{-1} F^* R^{-1} H \quad (10).$$

Instead of calculating the estimated magnetic field signal directly using Equation (10), as discussed above the localization module 1022 utilizes a matched filter, or correlator, to generate the matched filter detector output Λ by applying the linear filter h to the matrix H of low frequency magnetic field measurements $\vec{H}(\vec{r}_i)$ from the receivers 104. The linear filter h is used to generate the matched filter detector output Λ as shown in Equation (11) below.

$$\Lambda = h^* H \quad (11)$$

In Equation (11), it is assumed that the sources of noise v are normally distributed with zero-mean. Consequently, the standard form of the linear filter h that maximizes the signal-to-noise ratio (SNR) in the matched filter detector output Λ is given by Equation (12) shown below.

$$h = R^{-1} \tilde{H} \Rightarrow \Lambda = \tilde{H}^* R^{-1} H \quad (12)$$

Substituting $F(F^* R^{-1} F)^{-1} F^* R^{-1} H$ from Equation (10) for the estimated magnetic field signal $\tilde{H}$ in Equation (12) gives the matched filter detector shown below in Equation (13). As shown in Equation (13), the matched filter detector output Λ for the transmitter 106 located at a candidate location/position $\vec{r}_o$ of the transmitter 106 is based on the magnetic field measurement matrix H, the magnetic field function F associated with the candidate location of the transmitter 106, and noise covariance matrix R.

$$\Lambda(r_o) = H^* P H, \text{ where } P = R^{-1} F(F^* R^{-1} F)^{-1} F^* R^{-1} \quad (13)$$

If the noise vector $\vec{v}$ is Gaussian with zero mean, then in the absence of a signal (no source present) the matched filter detector output Λ has a chi-squared probability density with about three degrees of freedom (the dimension of vector $\tilde{m}$). With a signal present, the matched filter detector output Λ has a non-zero mean value (proportional to the array SNR) and the probability density of the matched filter detector output Λ is non-central chi-squared with about three degrees of freedom.

While the matched filter detector output Λ is a sufficient statistic for detection, a relatively important property of the matched filter detector output Λ in the present context is its usefulness as an objective function for localization.

In at least one example embodiment, the matched filter detector output Λ is a polynomial (e.g., quadratic) function of the unknown but hypothesized transmitter location $\vec{r}_o$ having a maximum value in the immediate vicinity of the actual location of the transmitter 106. The location of the transmitter 106 of the known magnetic field signal is declared at the point $\vec{r}_o$, which maximizes (or generates a maximum of) the matched filter detector output Λ. Localization (maximization of matched filter detector output Λ) may be performed over a broad area (or volume) by evaluating matched filter detector output Λ at hypothesized candidate locations (sometimes referred to as nodes) on a search grid, or by any of a number of nonlinear maximization algorithms as discussed herein.

According to at least one example embodiment, the matched filter detector output Λ is a polynomial function representing a plurality of candidate locations of the transmitter 106. In performing the search grid algorithm, the localization module 1022 evaluates the matched filter detector output Λ at each of a plurality of candidate locations (or nodes) to generate a plurality of values forming a localization contour associated with the candidate locations. The localization module 1022 then identifies the location of the transmitter 106 based on the contour values for the plurality of candidate locations. In one example, the localization module 1022 identifies the location of the transmitter at the candidate location having the maximum contour value among the plurality of contour values. Example contour values are discussed in more detail below with regard to FIG. 7.

Alternatively, for continuous tracking, a previously known location may be updated using a much faster single point tracking algorithm. The localization error associated with maximizing the matched filter detector output Λ is defined in terms of error ellipsoids, which are surfaces of uniform error variance $\sigma^2$, owing to the second order statistics of the matched filter detector output Λ. The size of the error ellipsoid is proportional to SNR while the shape depends on the geometry of sensor placement.

Figure 7:
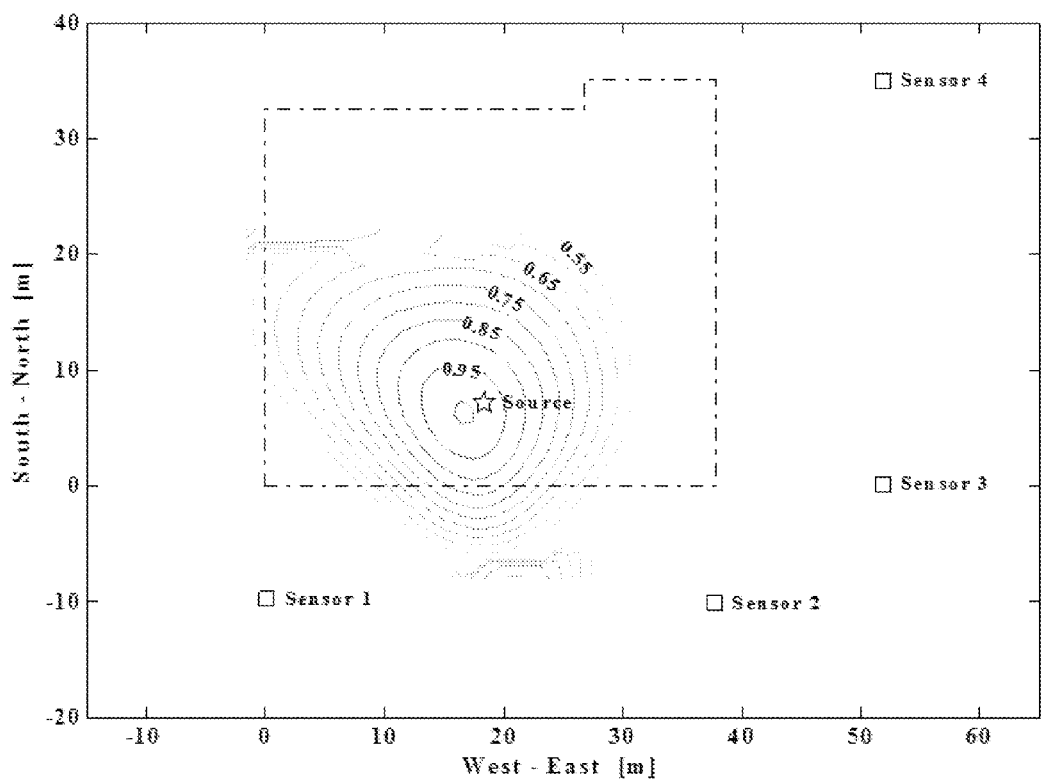
FIG. 7 is a graph showing experimental results that illustrate an example of how the localization objective function produces a single maximum value in a vicinity of a source location.

FIG. 7 is a graph illustrating an example from an actual experiment of how the matched filter detector output Λ produces a single maximum value in the vicinity of the transmitter.

Referring to FIG. 7, the actual location of the transmitter 106 is indicated by a star symbol. As shown, the transmitter 106 is located inside a commercial building outlined by the dash-dot line. Four receivers (Sensor 1, Sensor 2, Sensor 3 and Sensor 4) are positioned around the outside of the building as indicated by the square symbols. The contours of matched filter detector output Λ are shown with their normalized values. In this example, the maximum possible value is unity and the innermost contour is 0.99. The source location reported by the localization module 1022 is at the contour peak, which is within about one meter of the actual location.

In this example, the transmitter 106 is operating at about 0.35 watts. Localization error can be reduced and range increased by transmitting at higher power in short bursts.

The foregoing description of example embodiments has been provided for purposes of illustration and description. It is not intended to be exhaustive or to limit the disclosure. Individual elements or features of a particular example embodiment are generally not limited to that particular example embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for locating a transmitter, the method comprising:
    calculating a matched filter detector output for each of one or more candidate transmitter locations by applying a linear filter to low frequency magnetic field measurements obtained at a plurality of receiver locations, the linear filter being derived for the one or more candidate transmitter locations, and the matched filter detector output being a polynomial function representing the one or more candidate transmitter locations;
    generating a plurality of contour values associated with the one or more candidate transmitter locations based on the one or more calculated matched filter detector outputs; and
    determining the location of the transmitter based on the plurality of contour values for the one or more calculated matched filter detector outputs.

2. The method of claim 1, further comprising:
    hypothesizing a search domain including the one or more candidate transmitter locations.

3. The method of claim 1, wherein the determining the location of the transmitter comprises:
    identifying the location of the transmitter as the candidate location associated with a maximum matched filter detector output among the one or more calculated matched filter detector outputs.

4. The method of claim 3, wherein the determining the location of the transmitter further comprises:
    comparing the one or more calculated matched filter detector outputs to determine the maximum matched filter detector output among the one or more calculated matched filter detector outputs.

5. The method of claim 1, wherein the plurality of contour values form a localization contour associated with the one or more candidate transmitter locations, and wherein the location of the transmitter is determined based on the localization contour.

6. The method of claim 1, wherein the transmitter is determined to be located at the candidate location having a maximum contour value among the plurality of contour values.

7. The method of claim 1, wherein
    the polynomial function represents a plurality of candidate transmitter locations for the transmitter;
    the generating includes evaluating the polynomial function for each of the plurality of candidate transmitter locations to generate the plurality of contour values, each of the plurality of contour values being associated with a candidate location among the plurality of candidate transmitter locations; and
    the determining includes identifying the location of the transmitter based on the plurality of contour values.

8. The method of claim 7, wherein the location of the transmitter is identified as the candidate location among the plurality of candidate transmitter locations having a maximum contour value among the plurality of contour values.

9. The method of claim 1, further comprising:
    at least one of displaying and storing the location of the transmitter.

10. The method of claim 1, wherein the low frequency magnetic field measurements are generated based on magnetic field signals having frequencies between about 30 kHz and about 130 kHz.

11. The method of claim 1, wherein the linear filter is determined based on a propagation model associated with the one or more candidate transmitter locations, and wherein the propagation model does not include a complex image component.

12. The method of claim 1, wherein the linear filter is determined based on a propagation model associated with the one or more candidate transmitter locations, and wherein the propagation model does not account for effects defined by complex image theory.

13. A method for locating a transmitter, the method comprising:

maximizing a localization statistic by applying a linear filter to low frequency magnetic field measurements obtained at a plurality of receiver locations, the linear filter being determined based on a propagation model associated with one or more candidate transmitter locations, and the localization statistic being a polynomial function representing the one or more candidate transmitter locations;

generating a plurality of contour values associated with the one or more candidate transmitter locations based on the maximized location statistic; and locating the transmitter based on the plurality of contour values associated with the one or more candidate transmitter locations.

14. The method of claim 13, wherein the plurality of contour values form a localization contour associated with the one or more candidate transmitter locations, and wherein the location of the transmitter is determined based on the localization contour.

15. The method of claim 13, wherein the transmitter is determined to be located at the candidate location having a maximum contour value among the plurality of contour values.

16. An apparatus for locating a transmitter, the apparatus comprising:
a central processor configured to
calculate a matched filter detector output for each of one or more candidate transmitter locations by applying a linear filter to low frequency magnetic field measurements obtained at a plurality of receiver locations, the linear filter being derived for the one or more candidate transmitter locations, and the matched filter detector output being a polynomial function representing the one or more candidate transmitter locations;

generate a plurality of contour values associated with the one or more candidate transmitter locations based on the one or more calculated matched filter detector outputs; and determine the location of the transmitter based on the plurality of contour values for the one or more calculated matched filter detector outputs.

17. The apparatus of claim 16, wherein the central processor is further configured to hypothesize a search domain including the one or more candidate transmitter locations.

18. The apparatus of claim 16, wherein the central processor is configured to identify the location of the transmitter as the candidate location associated with a maximum matched filter detector output among the one or more calculated matched filter detector outputs.

19. The apparatus of claim 18, wherein the central processor is configured to compare the one or more calculated matched filter detector outputs to determine the maximum matched filter detector output among the one or more calculated matched filter detector outputs.

20. The apparatus of claim 16, wherein the plurality of contour values form a localization contour associated with the one or more candidate transmitter locations, and wherein the central processor is configured to determine the location of the transmitter based on the localization contour.

21. The apparatus of claim 16, wherein the transmitter is located at the candidate location having a maximum contour value among the plurality of contour values.

22. The apparatus of claim 16, wherein
the polynomial function represents a plurality of candidate transmitter locations for the transmitter; and
the central processor is configured to, evaluate the polynomial function for each of the plurality of candidate transmitter locations to generate the plurality of contour values, each of the plurality of contour values being associated with a candidate location among the plurality of candidate transmitter locations, and identify the location of the transmitter based on the plurality of contour values.

23. The apparatus of claim 16, further comprising:
a display configured to display the location of the transmitter.

24. The apparatus of claim 16, further comprising:
a data storage configured to store the location of the transmitter.

25. The apparatus of claim 16, wherein the low frequency magnetic field measurements are generated based on magnetic field signals having frequencies between about 30 kHz and about 130 kHz.

26. The apparatus of claim 16, wherein the linear filter is determined based on a propagation model associated with the one or more candidate transmitter locations, and wherein the propagation model does not include a complex image component.

27. The apparatus of claim 16, wherein the linear filter is determined based on a propagation model associated with the one or more candidate transmitter locations, and wherein the propagation model does not account for effects defined by complex image theory.

28. An apparatus for locating a transmitter, the apparatus comprising:
a central processor configured to
maximize a localization statistic by applying a linear filter to low frequency magnetic field measurements obtained at a plurality of receiver locations, the linear filter being determined based on a propagation model associated with one or more candidate transmitter locations, and the localization statistic being a polynomial function representing the one or more candidate transmitter locations;

generate a plurality of contour values associated with the one or more candidate transmitter locations based on the maximized location statistic; and locate the transmitter based on the plurality of contour values associated with the one or more candidate transmitter locations.

29. The apparatus of claim 28, wherein the plurality of contour values form a localization contour associated with the one or more candidate transmitter locations, and wherein the central processor is configured to determine the location of the transmitter based on the localization contour.

30. A non-transitory computer readable storage medium storing instructions that, when executed, cause a processor to perform a method for locating a transmitter, the method comprising:
calculating a matched filter detector output for each of one or more candidate transmitter locations by applying a linear filter to low frequency magnetic field measurements obtained at a plurality of receiver locations, the linear filter being derived for the one or more candidate transmitter locations, and the matched filter detector output being a polynomial function representing the one or more candidate transmitter locations;

generating a plurality of contour values associated with the one or more candidate transmitter locations based on the one or more calculated matched filter detector outputs; and determining the location of the transmitter based on the plurality of contour values for the one or more calculated matched filter detector outputs.

31. The computer readable storage medium of claim 30, wherein the method further comprises:
hypothesizing a search domain including the one or more candidate transmitter locations.

32. The computer readable storage medium of claim 30, wherein the determining the location of the transmitter comprises:
identifying the location of the transmitter as the candidate location associated with a maximum matched filter detector output among the one or more calculated matched filter detector outputs.

33. The computer readable storage medium of claim 32, wherein the determining the location of the transmitter further comprises:
comparing the one or more calculated matched filter detector outputs to determine the maximum matched filter detector output among the one or more calculated matched filter detector outputs.

34. The computer readable storage medium of claim 30, wherein the plurality of contour values form a localization contour associated with the one or more candidate transmitter locations, and wherein the location of the transmitter is determined based on the localization contour.

35. The computer readable storage medium of claim 30, wherein the transmitter is determined to be located at the candidate location having a maximum contour value among the plurality of contour values.

36. The computer readable storage medium of claim 30, wherein
the polynomial function represents a plurality of candidate transmitter locations for the transmitter;
the generating includes evaluating the polynomial function for each of the plurality of candidate transmitter locations to generate the plurality of contour values, each of the plurality of contour values being associated with a candidate location among the plurality of candidate transmitter locations; and
the determining includes identifying the location of the transmitter based on the plurality of contour values.

37. The computer readable storage medium of claim 36, wherein the location of the transmitter is identified as the candidate location among the plurality of candidate transmitter locations having a maximum contour value among the plurality of contour values.

38. The computer readable storage medium of claim 30, wherein the method further comprises:
at least one of displaying and storing the location of the transmitter.

39. The computer readable storage medium of claim 30, wherein the low frequency magnetic field measurements are generated based on magnetic field signals having frequencies between about 30 kHz and about 130 kHz.

40. The computer readable storage medium of claim 30, wherein the linear filter is determined based on a propagation model associated with the one or more candidate transmitter locations, and wherein the propagation model does not include a complex image component.

41. The computer readable storage medium of claim 30, wherein the linear filter is determined based on a propagation model associated with the one or more candidate transmitter locations, and wherein the propagation model does not account for effects defined by complex image theory.

42. A non-transitory computer readable storage medium storing instructions that, when executed, cause a processor to perform a method for locating a transmitter, the method comprising:
maximizing a localization statistic by applying a linear filter to low frequency magnetic field measurements obtained at a plurality of receiver locations, the linear filter being determined based on a propagation model associated with one or more candidate transmitter locations, and the localization statistic being a polynomial function representing the one or more candidate transmitter locations;
generating a plurality of contour values associated with the one or more candidate transmitter locations based on the maximized location statistic; and
locating the transmitter based on the plurality of contour values associated with the one or more candidate transmitter locations.

43. The computer readable medium of claim 42, wherein the plurality of contour values form a localization contour associated with the one or more candidate transmitter locations, and wherein the location of the transmitter is determined based on the localization contour.

44. The computer readable medium of claim 42, wherein the transmitter is determined to be located at the candidate location having a maximum contour value among the plurality of contour values.

* * * * *